United States Patent
Cheng et al.

(10) Patent No.: US 10,454,850 B2
(45) Date of Patent: Oct. 22, 2019

(54) APPARATUS AND METHOD FOR BUFFERING DATA IN A SWITCH

(71) Applicant: Intel Corporation, Santa Clara, CA (US)

(72) Inventors: Albert S. Cheng, Bellevue, WA (US); Thomas D. Lovett, Portland, OR (US); Michael S. Parker, Santa Clara, CA (US); Steven F. Hoover, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 15/531,694

(22) PCT Filed: Dec. 24, 2014

(86) PCT No.: PCT/US2014/072369
§ 371 (c)(1),
(2) Date: May 30, 2017

(87) PCT Pub. No.: WO2016/105414
PCT Pub. Date: Jun. 30, 2016

(65) Prior Publication Data
US 2017/0295112 A1 Oct. 12, 2017

(51) Int. Cl.
*H04L 12/933* (2013.01)
*H04L 12/935* (2013.01)
(Continued)

(52) U.S. Cl.
CPC ...... *H04L 49/3036* (2013.01); *H04L 12/6418* (2013.01); *H04L 49/103* (2013.01);
(Continued)

(58) Field of Classification Search
CPC ......... H04L 47/10; H04L 47/11; H04L 47/29; H04L 12/5602; H04L 12/56; H04L 12/50
See application file for complete search history.

(56) References Cited

U.S. PATENT DOCUMENTS 6,539,024 B1 * 3/2003 Janoska ............... H04L 47/10
370/229
2002/0141427 A1 10/2002 McAlpine
(Continued)

FOREIGN PATENT DOCUMENTS

JP H09-162884 A 6/1997
KR 10-2013-008591 A 7/2013

OTHER PUBLICATIONS

International Search Report and Written Opinion dated Sep. 22, 2015 for International Patent Application No. PCT/US2014/072369, 14 pages.
(Continued)

*Primary Examiner* — Jae Y Lee
*Assistant Examiner* — Aixa A Guadalupe Cruz
(74) *Attorney, Agent, or Firm* — Schwabe, Williamson & Wyatt, P.C.

(57) ABSTRACT

Apparatuses, methods and storage medium associated with buffering data in a switch are provided. In embodiments, the switch may include a plurality of queue buffers, a plurality of queues respectively associated with the plurality of queue buffers, a shared buffer, and a queue point controller coupled with the plurality of queue buffers and the shared buffer. In embodiments the queue point controller may be configured to determine an amount of available space in a selected queue buffer of the plurality of queue buffers. The queue point controller may be further configured to allocate at least a portion of the shared buffer to a selected queue that is associated with the selected queue buffer. In embodiments, this allocation may be based on the amount of available
(Continued)

space determined in the selected queue buffer. Other embodiments may be described and/or claimed.

25 Claims, 4 Drawing Sheets

(51) Int. Cl.
  *H04L 12/861* (2013.01)
  *H04L 12/64* (2006.01)
  *H04L 12/937* (2013.01)
  *H04L 12/931* (2013.01)

(52) U.S. Cl.
  CPC ........ *H04L 49/254* (2013.01); *H04L 49/9036* (2013.01); *H04L 49/101* (2013.01); *H04L 49/505* (2013.01)

(56) References Cited

U.S. PATENT DOCUMENTS

| | | | |
|---|---|---|---|
| 2006/0092837 A1* | 5/2006 | Kwan | H04L 47/10 370/229 |
| 2007/0053350 A1 | 3/2007 | Spink et al. | |
| 2008/0205278 A1 | 8/2008 | Garmire et al. | |
| 2011/0075555 A1 | 3/2011 | Ziegler | |
| 2014/0140206 A1 | 5/2014 | Hendel et al. | |
| 2015/0026361 A1* | 1/2015 | Matthews | H04L 67/28 709/234 |

OTHER PUBLICATIONS

Extended European Search Report dated Jun. 26, 2018 for European Patent Application No. 14909254.6, 7 pages.
Office Action dated Dec. 4, 2018 for Japanese Patent Application No. 2017-526669, 4 pages.

* cited by examiner

APPARATUS AND METHOD FOR BUFFERING DATA IN A SWITCH

CROSS REFERENCE TO RELATED APPLICATIONS

The present application is a national phase entry under 35 U.S.C. § 371 of International Application No. PCT/US2014/072369, filed Dec. 24, 2014, entitled "APPARATUS AND METHOD FOR BUFFERING DATA IN A SWITCH ", which designated, among the various States, the United States of America. The Specification of the PCT/US2014/072369 Application is hereby incorporated by reference.

TECHNICAL FIELD

The present disclosure relates to the field of networking. More particularly, the present disclosure relates to buffering data in switches.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Legacy input-queued switches may experience performance problems due to head-of-line (HOL) blocking. HOL blocking may refer to a situation wherein a packet at the head of a queue (head packet) is unable to be serviced due to a conflict related to one or more resources of the switch. Because the packet is unable to be serviced, the packet may not be transferred out of the queue. As a result, the packet may block other subsequent packets in the same queue, and may prevent service of the subsequent packets behind it in the queue, even if those subsequent packets do not have a similar resource conflict.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
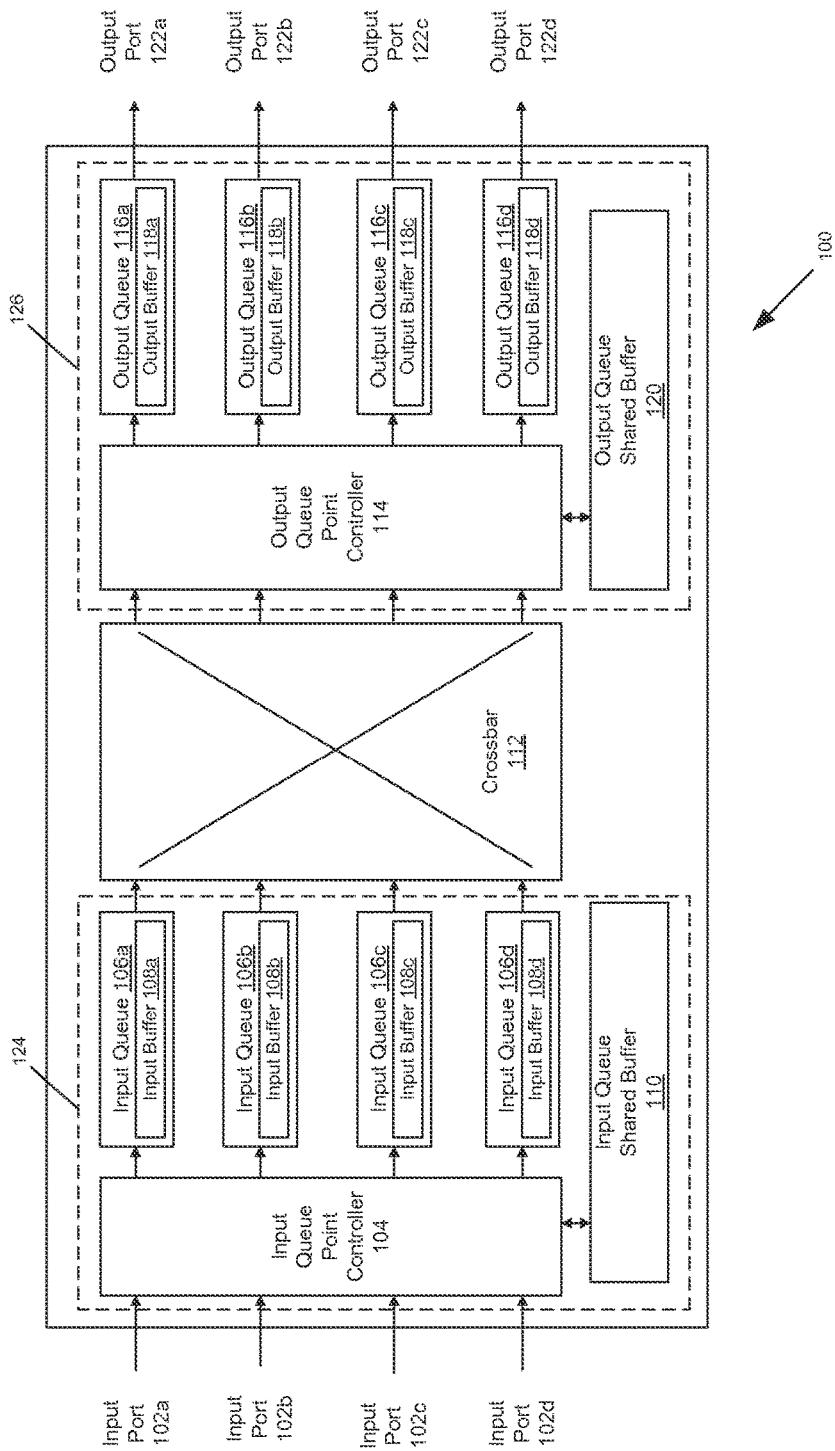
FIG. 1 illustrates a block diagram of a switch incorporated with the buffering teachings of the present disclosure, according to the disclosed embodiments.

Apparatuses, methods and storage media associated with buffering data in a switch are provided herein. In embodiments, the switch may include a plurality of input ports and a plurality of output ports. The switch may receive a packet, or portion thereof, at an input port that is to be routed to a destination node. The switch may include one or more queue points at which the packet or portions thereof may be buffered. These queue points may include a plurality of queue buffers and a plurality of queues, coupled with respective ones of the plurality of input ports, and respectively associated with the plurality of queue buffers. The queue buffers may be relatively small discrete buffers to buffer packets to be routed, or portions thereof, in a selected one of the queue buffers associated with a selected queue. In embodiments, the selected queue may be a queue associated with an appropriate output port of the switch to enable the packet to reach the destination node.

In some embodiments, the queue point may also include a shared buffer and a queue point controller coupled with the plurality of queue buffers and the shared buffer. The queue point controller may be configured to determine an amount of available space in the selected queue buffer, and allocate at least a portion of the shared buffer to the selected queue based on the amount of available space determined in the selected queue buffer. This may enable the selected queue to effectively operate as if it had a larger buffer without having to have such a larger buffer dedicated to each selected queue. Resultantly, more efficient operation may be achieved with less real estate and/or power requirement on the integrated circuit components of the switch.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates a switch 100 in accordance with various embodiments of the present disclosure. Switch 100 may include a plurality of input ports 102a-d and a plurality of output ports 122a-d. Switch 100 may be configured to route packets (e.g. data or control packets) received at an input port 102a-d to one of the output ports 120a-d. In some embodiments, the switch may be configured with crossbar 112 to route packets from any of the input ports 102a-d to any of the output ports 120a-d. While depicted as a four port switch for illustrative purposes, it will be appreciated that any number of ports may be utilized without departing from the scope of the present disclosure. In addition, in some embodiments, switch 100 may be a sub-switch of a larger switch or may be part of a matrix switch.

Figure 3:
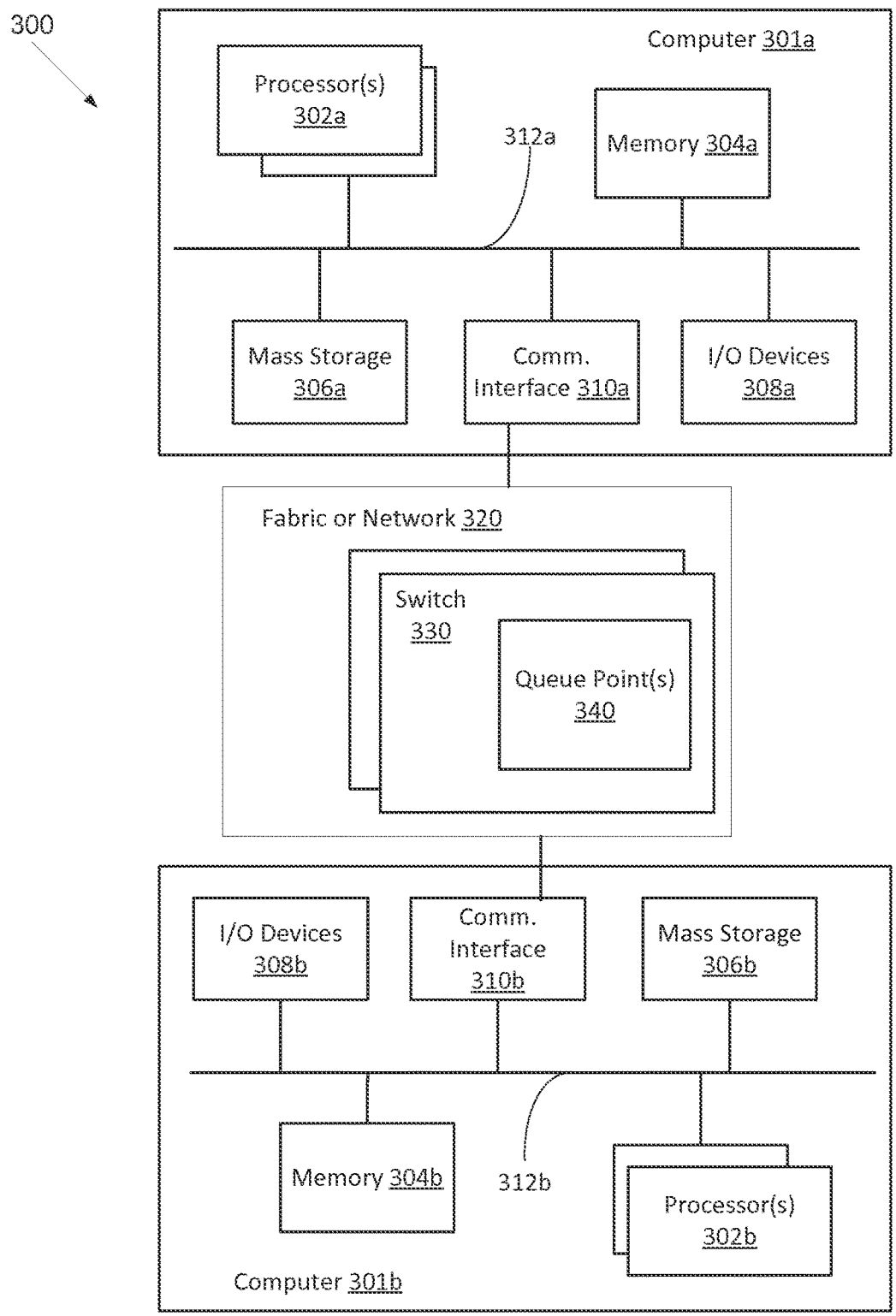
FIG. 3 illustrates an example computing system suitable for use to practice various aspects of the present disclosure, according to the disclosed embodiments.

In some embodiments, switch 100 may be coupled with a plurality of processors (such as processor(s) 302a-b of FIG. 3) and may be used to route data between the plurality of processors. In some embodiments, a plurality of switches (e.g., switches 100) may be coupled with one another to form a fabric or network to route data between such a plurality of processors. The plurality of switches of the fabric or network may be interconnected to provide multiple routing paths between any two processors of such a plurality of processors.

In various embodiments, switch 100 may further include one or more queue points. As used herein, a queue point may be utilized to indicate any location in a switch in which a packet, or portion thereof, being routed through the switch may be queued in a buffer. In embodiments, such a scenario may occur when the packet, or portion thereof, is being transmitted to a downstream neighbor that is not yet available for processing. As used herein, downstream neighbor may be utilized to indicate a next location, within the switch or within the network, to which a packet is being routed to reach a final destination.

Similarly, upstream neighbor may be utilized to indicate an immediately previous location, within the switch or within the network, through which a packet was routed. Upstream neighbor may also be referred to herein as a transmission point.

As depicted, switch 100 may have an input queue point 124 and an output queue point 126. In other embodiments, switch 100 may have additional intermediate queue points, such as, for example, in embodiments where switch 100 is a matrix switch. The discussion herein is applicable to any such queue points.

In embodiments, input queue point 124 may include a plurality of input queues 106a-106d. Input queues 106a-106d may be respectively associated with a corresponding plurality of input buffers 108a-108d. Input buffers 108a-108d may be configured to store packets, or portions thereof, routed to the respective queue in anticipation of transmitting the packet to a respective downstream neighbor. In embodiments, input queue point 124 may include an input queue shared buffer 110. Input queue shared buffer 110 may provide additional buffering capacity to input queue point 124. Input queue point 124 may also include an input queue point controller 104. Input queue point controller 104 may be coupled with input queue buffers 108a-108d and input queue shared buffer 110.

In some embodiments, the plurality of input queues 106a-106d, may be further organized to support a plurality of virtual lanes, or virtual channels. In such embodiments, the plurality of input buffers 108a-108d may be organized into blocks associated with each of the virtual lanes. In such embodiments, the buffering described herein below with respect to individual queues, may be performed on a virtual lane basis in a similar manner.

In embodiments, input queue point controller 104 may be configured to receive a portion (e.g., a flit) of a packet, from a transmission point and may determine an amount of available space in an input buffer (e.g., input buffer 108a) of an input queue (e.g., input queue 106a) in which the portion of the packet may be temporarily stored. In embodiments, the portion of the packet, and the remainder of the packet, may be destined for an output port (e.g., output port 122d) of switch 100. Such an output port may be determined from a destination location identifier (DLID) contained within a header of the packet and a lookup table to determine the appropriate output port to route the received portion of the packet to.

In some instances, output port 122d may be free to service a packet. In such instances, the received portion may be forwarded on to output queue 116d, that is coupled with output port 122d, with little or no buffering of the received portion needed at input queue 106a. In other instances output port 122d may be busy servicing another packet. In such instances, the received portion may be buffered in input buffer 108a of input queue 106a until output port 122d is available to service the packet associated with the received portion.

Once the received portion is buffered in input buffer 108a an additional portion of the packet may be received from the transmission point. If output port 122d has been freed up, the previously received portion of the packet may be able to be moved out of input buffer 108a and may be transmitted to output queue 116d. If, however, output port 122d has not been freed up, the additional portion of the packet may be buffered in input buffer 108a along with the previously received portion of the packet, provided there is sufficient space available in input buffer 108a. Such a process may continue until the entire packet is buffered within input buffer 108a; input buffer 108a reaches a maximum capacity with portions of the packet; or output port 122d frees up and is available to begin processing the portions of the packet that have been buffered in input buffer 108a. In instances where the entire packet is able to be buffered in input buffer 108a, the entire packet may be moved away from the transmission point to enable the transmission point sending the packet to input port 102a to begin processing a next packet. Likewise, in instances where output port 122d frees up, the buffered portions of the packet may begin to move out of input queue 106a to output queue 116d and the flow of portions of the packet from the transmission point may continue unimpeded. If, however, input buffer 108a reaches capacity prior to receiving the entirety of the packet or before output port 122d frees up, any remaining portions of the packet yet to be transmitted by the transmission point may block any further transmissions from the transmission point or may block another transmission point upstream. It will be appreciated that, in some embodiments, input buffer 108a may be large enough to store one or more previously received packets in addition to the received portions of the packet discussed above. Such embodiments are contemplated by this disclosure but are not discussed at length in an effort to not overly complicate the discussion of allocating additional space from the shared buffer.

To avoid such blocking of the transmission point, in some embodiments, input queue point controller 104 may be configured to allocate at least a portion of input queue shared buffer 110 to input queue 106a. Such an allocation may enable the entirety of the packet to be moved away from the transmission point and allow the transmission point to be freed up and continue unimpeded. This may be the case even if output port 122*d* is blocked and is unable to begin servicing any portions of the packet buffered in input buffer 108*a*. In some embodiments, input queue point controller 104 may be configured to allocate the at least a portion of input queue shared buffer 110 to input queue 106*a* based on an amount of available space in input buffer 108*a* and whether the amount of available space in the input buffer 108*a* is equal to or less than a predefined threshold of available space, such a threshold is discussed further below. In some embodiments, input queue point controller 104 may be configured to determine a size of the packet (e.g., from a header of the packet) and may utilize the size of the packet in determining a the size of the portion of input queue shared buffer 110 to allocate.

In some embodiments, switch 100 may be configured to utilize various flow control mechanisms to control flow of data through switch 100. For example, in some embodiments, switch 100 may be configured to utilize a credit based flow control mechanism. In such embodiments, a transmission point, such as the one discussed above, may include a counter configured to monitor available space in a buffer (e.g., input buffer 108*a*) of a queue (e.g., input queue 106*a*) to which the transmission point is sending data. In such embodiments, the transmission point, in response to a reset of the switch on which the transmission point resides, may be configured to reset the counter to a known quantity of available slots in input buffer 108*a* of input queue 106*a*. Each of these slots may be configured to store a single fixed size portion (e.g., a flit) of a packet. For each of these portions of a packet that the transmission point sends to input queue 106*a*, the counter may be decremented to indicate the number of available slots remaining in input buffer 108*a*.

In addition, as portions of the packet are moved away from input queue 106*a* to a next downstream neighbor, a signal, or acknowledgement, may be sent to the transmission point to cause the counter to increment. As a result, in credit based flow control, this decrementing of the counter may occur until the signal, or acknowledgment, is received from input queue 106*a* that the buffered portions of the packet have begun to move away from input queue 106*a* to the next downstream neighbor. In such an embodiment, the transmission point may stop sending portions of the packet when the counter indicates that input buffer 108*a* of input queue 106*a* has no more available slots.

Each portion of a packet may take several clock cycles to travel from the transmission point to input queue 106*a*. Likewise, the acknowledgment sent from input queue 106*a* may take several clock cycles to travel from input queue 106*a* to the transmission point. As a result, and because a new portion of the packet may be sent from the transmission point at every clock cycle, the number of portions of a packet that may be sent before an acknowledgment may be received by the transmission point may be dependent on a round trip travel time, referred to hereinafter as round trip time, between the transmission point and input queue 106*a*. For example, consider an embodiment where it takes 4 clock cycles for a packet to travel from the transmission point to input queue 106*a* and the acknowledgment takes a corresponding 4 clock cycles to travel from input queue 106*a* to the transmission point. In such an example, the round trip time between the transmission point and input queue 106*a* would be the sum of the two travel times, or 8 clock cycles. As such, in this example, the transmission point may transmit 8 portions of the packet before receiving an acknowledgment from input queue 106*a*.

In some embodiments, the transmission point may not be aware of any additional space available to input queue 106*a*. In such embodiments, input queue point controller 104 may cause the above discussed acknowledgment to be sent when additional space is able to be allocated to input queue 106*a*. This acknowledgment may prevent the counter from decrementing or may cause the counter to increment depending on the configuration of the counter. In doing this, input queue point controller 104 may enable continuous flow of data from the transmission point into input queue 106*a* without the transmission point having any knowledge of the additional buffer space available to input queue 106*a*. As such, the additional buffer space may be invisible from the perspective of the transmission point.

Because of the above discussed round trip time, input queue point controller 104 may seek to allocate additional space prior to input buffer 108*a* reaching capacity. If input queue point controller waits until input buffer 108*a* reaches capacity to allocate additional space in input queue shared buffer 110, the round trip travel time may cause the transmission point to be blocked while awaiting an acknowledgment. As such, in the example round trip time discussed above, 8 portions of the packet may not be sent that could have been sent. As a result, input queue point controller may be configured to allocate a portion of input queue shared buffer 110 when the number of available slots in input buffer 108*a* is equal to or less than a threshold, where the threshold is equal to or greater than the round trip time. Such a configuration may prevent or reduce the impact of the round trip time. In such embodiments, input queue point controller 104 may be configured to maintain its own shadow counter to essentially mimic that of the transmission point and may be configured to allocate a portion of input queue shared buffer 110 once this counter reaches or falls below the above discussed round trip travel time threshold. Once a portion of input queue shared buffer is successfully allocated, input queue point controller 104 may cause the above discussed acknowledgment to be sent to the transmission point to cause the transmission point to think that portions of packets are being moved away from input queue 106*a* to a next downstream neighbor.

The input queue point controller 104 may also monitor an amount of available space allocated in input queue shared buffer 110 to one of the queues of input queue point 124, and may seek to allocate additional blocks of the input queue shared buffer in the event that the available allocated space reaches or falls below a threshold, such as that discussed above.

In addition, in some embodiments, input queue point controller 104 may monitor any blocks allocated to determine when the blocks may no longer be needed. In such embodiments, input queue point controller 104 may free or release any blocks that have been determined to no longer be needed. In some embodiments, the determination of when a block is no longer needed may be based simply on whether the block is empty. Such a situation may occur when all portions of the various packets stored in the block have been moved away from the block to a next downstream neighbor. In other embodiments, the determination of when a block is no longer needed may be based further on whether the amount of available space in another block allocated to the same queue either reaches or exceeds the threshold discussed above. In other embodiments, the determination of when a block is no longer needed may be based further on whether the amount of available space in a another block allocated to the same queue either reaches or exceeds the number of slots indicated by the shadow counter discussed above.

Output queue point 126 may be configured in a similar manner to input queue point 124. For example, output queue point 126 may include output queue point controller 114 coupled with a plurality of output queue 116a-116d and an output queue shared buffer 120. Each of the output queues 116a-116d may be associated with an output queue buffer 118a-118d, respectively. In embodiments, output queue point 126 may be configured to function in a similar manner to input queue point 124 discussed above. As such, input queue point 124 may be a transmission point for output queue point 126.

It will be appreciated that, as a packet moves from a transmission point to a queue point, the queue point would then become a next transmission point and the next downstream neighbor from the queue point would become a next queue point. This may occur until the packet is delivered to an intended destination.

In some embodiments, switch 100 may include one or more processors packaged together with memory having computational logic configured to perform one or more operations of the processes described herein. In such embodiments, switch 100 may take the form of a System on Chip (SoC). Such a SoC may be utilized in any suitable computing device or as a stand-alone switch.

Figure 2:
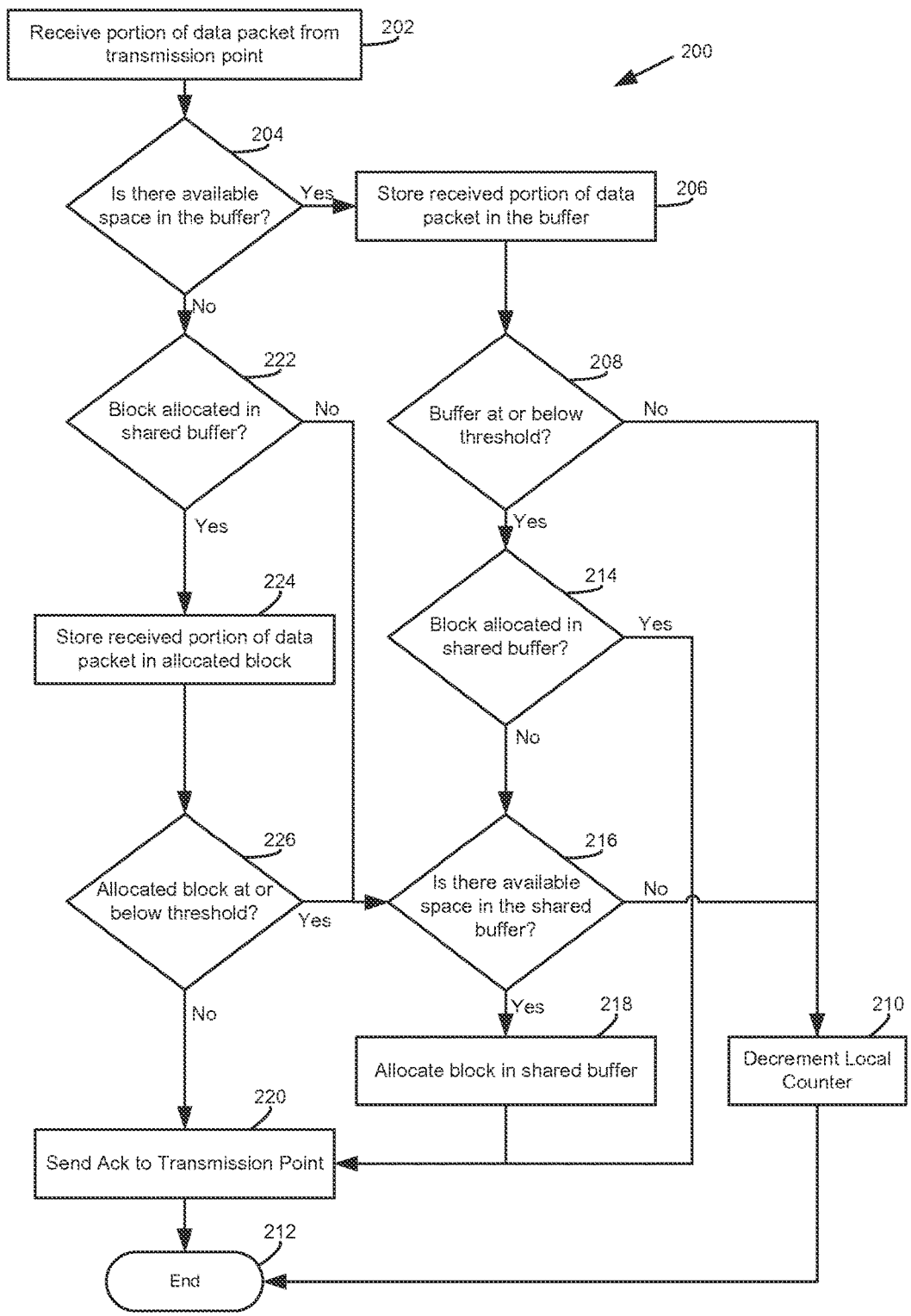
FIG. 2 illustrate an example process for routing data in a switch, according to the disclosed embodiments.

FIG. 2 illustrates a method 200 for buffering data in a switch, in accordance with various embodiments. The method 200 may be performed by, for example, by either of input queue point controller 104 or output queue point controller 114 of switch 100. In some embodiments, a switch may include or have access to one or more non-transitory computer-readable media having instructions, stored thereon, that when executed cause the switch to perform the method 200.

At box 202 of the method 200, a queue point controller of the switch may receive a packet, or portion thereof, that is to be routed to a destination node via a selected queue. The packet may be received, for example, via an input port of the switch. At box 204 a queue point controller of the switch may determine if there is available space in a buffer of the selected queue. If there is available space in the buffer of the selected queue, method 200 may proceed to box 206 where the received portion of the packet may be stored in the buffer of the selected queue.

At box 208 a determination may be made by the queue point controller of whether the buffer of the selected queue has reached or fallen below a predefined threshold of available space, such as that discussed above in reference to FIG. 1. If the queue point controller determines that the buffer of the selected queue has not reached or fallen below the predefined threshold of available space, method 200 may proceed, in some embodiments, to box 210 where a local counter, such as the shadow counter mentioned above in reference to FIG. 1, may be decremented to mimic a counter of a transmission point that sent the portion of the packet. Once the local counter is decremented, method 200 may proceed to box 212 where the process may end. It will be appreciated that, while box 212 indicates an end of the process, the process may be repeated for each additional portion of a packet received by the queue point controller.

Returning to box 208, if the queue point controller determines that the buffer of the selected queue has reached or fallen below the predefined threshold of available space, method 200 may proceed, in some embodiments, to box 214. At box 214, the queue point controller may determine whether a block, or portion, of a shared buffer (e.g., input queue shared buffer 110) has been allocated to the selected queue. If such a block has been allocated, the process may proceed to box 220 where the queue point controller may cause an acknowledgement, such as that discussed above in reference to FIG. 1, to be sent to the transmission point to prevent a counter of the transmission point associated with the selected queue from decrementing. Method 200 may then proceed to box 212 where the method may end.

Returning to box 214, if the queue point controller determines that a block of the shared buffer (e.g., input queue shared buffer 110) has not been allocated to the selected queue, method 200 may proceed to box 216. At box 216, a determination may be made as to whether there is available space in the shared buffer. If there is not available space in the shared buffer, method 200 may proceed to box 210 where the local counter is decremented and may then proceed to box 212 where method 200 may end. On the other hand, if there is available space in the shared buffer, method 200 may proceed to box 218 where the queue point controller may allocate a block, or portion, of the shared buffer to the selected queue and may be effectively appended on to the end of the buffer of the selected queue. In some embodiments, at block 218, the input queue point controller may be configured to determine a size of the packet (e.g., from a header of the packet) and may utilize the size of the packet in determining the size of the block, or portion, of the shared buffer 110 to allocate. Once the block is allocated to the queue, method 200 may proceed to box 220 where the queue point controller may cause an acknowledgement, such as that discussed above in reference to FIG. 1, to be sent to the transmission point to prevent a counter of the transmission point associated with the selected queue from decrementing. Method 200 may then proceed to box 212 where the method may end. Returning to box 204, if there is not available space in the buffer of the selected queue, method 200 may proceed to box 222 where the queue point controller may determine whether a block, or portion, of a shared buffer (e.g., input queue shared buffer 110) has been allocated to the selected queue. If such a block has not been allocated, the process may proceed to box 216. As discussed above, at box 216, a determination may be made as to whether there is available space in the shared buffer. If there is not available space in the shared buffer, method 200 may proceed to box 210 where the local counter is decremented and may then proceed to box 212 where method 200 may end. On the other hand, if there is available space in the shared buffer, method 200 may proceed to box 218 where the queue point controller may allocate a block, or portion, of the shared buffer to the selected queue. Such an allocated block or portion may be effectively appended on to the end of the buffer of the selected queue. As discussed above, in some embodiments, at block 218, the input queue point controller may be configured to determine a size of the packet (e.g., from a header of the packet) and may utilize the size of the packet in determining the size of the block, or portion, of the shared buffer 110 to allocate. Once the block is allocated to the selected queue, method 200 may proceed to box 220 where the queue point controller may cause an acknowledgement, such as that discussed above in reference to FIG. 1, to be sent to the transmission point to prevent a counter of the transmission point associated with the selected queue from decrementing. Method 200 may then proceed to box 212 where the method may end.

Returning to box 222, if the queue point controller determines that a block of the shared buffer (e.g., input queue shared buffer 110) has been allocated to the selected queue, method 200 may proceed to box 224. At box 224, the queue point controller may cause the received portion of the packet to be stored in the allocated block of the shared buffer. Method 200 may then proceed to box 226.

At box 226 a determination may be made by the queue point controller of whether the allocated block of the shared queue has reached or fallen below a predefined threshold of available space, such a threshold may be the same as or different from the threshold discussed in reference to box 208, above. If the queue point controller determines that the allocated block of the shared queue has not reached or fallen below the predefined threshold of available space, method 200 may proceed to box 220 where the queue point controller may cause an acknowledgement, such as that discussed above in reference to FIG. 1, to be sent to the transmission point to either increment a counter of the transmission point associated with the selected queue or prevent a counter of the transmission point associated with the selected queue from decrementing. Method 200 may then proceed to box 212 where the method may end.

Returning to box 226, if the queue point controller determines that the allocated block of the shared buffer of the selected queue has reached or fallen below the predefined threshold of available space, method 200 may proceed, in some embodiments, to box 216. As discussed above, at box 216, a determination may be made as to whether there is available space in the shared buffer. If there is not available space in the shared buffer, method 200 may proceed to box 210 where the local counter is decremented and may then proceed to box 212 where method 200 may end. On the other hand, if there is available space in the shared buffer, method 200 may proceed to box 218 where the queue point controller may allocate an additional block, or portion, of the shared buffer to the selected queue. This additional block, or portion, of the shared queue may be effectively appended on to the end of a previously allocated block, or portion. As discussed above, in some embodiments, at block 218, the input queue point controller may be configured to determine a size of the packet (e.g., from a header of the packet) and may utilize the size of the packet in determining the size of the block, or portion, of the shared buffer 110 to allocate. Once the block is allocated to the queue, method 200 may proceed to box 220 where the queue point controller may cause an acknowledgement, such as that discussed above in reference to FIG. 1, to be sent to the transmission point to prevent a counter of the transmission point associated with the selected queue from decrementing. Method 200 may then proceed to box 212 where the method may end.

As mentioned above, in some embodiments, the threshold of the allocated blocks may be different from the threshold for the buffer of the selected queue. In such embodiments, the threshold of the allocated blocks may be greater than that of the buffer of the selected queue. In these embodiments, the queue point controller may still seek to allocate a new block in the shared buffer once the available space in the allocated block reaches or falls below the threshold of the allocated block, however, the above discussed acknowledgment may still be sent until the amount of available space in the allocated block equals the value of the local counter. In some embodiments, the queue point controller may continue to send the above discussed acknowledgment to the transmission point even when a packet is not received from the transmission point. In such embodiments, an acknowledgment may be sent by the queue point controller to the transmission point so long as the amount of available space allocated in the shared buffer is greater than the value of the local counter. In such embodiments, once the local counter reaches the maximum value of the counter (e.g., the size of the selected queue buffer), or once the local counter reaches the amount of available space allocated in the shared buffer, the queue point controller may cease to send the acknowledgment. It will be appreciated that, in these embodiments, the queue point controller may also decrement the local counter once portions of a packet begin to be received again to enable the local counter to mimic the counter of the transmission point.

FIG. 3 illustrates an example computing system 300 (hereinafter "system 300") that may be suitable for use to practice selected aspects of the present disclosure. As shown, system 300 may include a plurality of computers 301a-b, and a fabric or network 320 coupled to the computers. The fabric or network 320 may include a plurality of switches 330 coupled to one another to route data between the computers 301a-b (e.g., between the processors 302a-b of the computers 301a-b, respectively). One or more of the switches 330 may correspond to the switch 100 described herein (having queue points 340 corresponding to queue points 124 and 126) and/or may perform the method 200 described herein.

The computers 301a-b may be coupled to a plurality of the switches 330 to provide multiple routing paths between two computers 301a-b. Although only two computers 301a-b are shown in FIG. 3, it will be appreciated that the fabric or network 320 and/or switches 330 may be used to route data between any suitable number of computers, including more than two computers. The switch may include one or more queue points 340, such as the queue points discussed above in reference to FIG. 1, to perform one or more aspects of the buffering process described herein. In some embodiments, the switch 330 may be coupled to the communication interfaces 310a-b of the computers 301a-b, respectively. Alternatively, or additionally, the switch 330 may be coupled to a plurality of processors 302a-b of a single computer 301a to route data between the processors 302a-b.

The individual computers 301a-b may include one or more processors or processor cores 302a-b, and system memory 304a-b. For the purpose of this application, including the claims, the terms "processor" and "processor cores" may be considered synonymous, unless the context clearly requires otherwise. Additionally, computers 301a-b may include mass storage devices 306a-b, respectively, (such as diskette, hard drive, compact disc read only memory (CD-ROM) and so forth), input/output devices 308a-b, respectively, (such as display, keyboard, cursor control and so forth) and communication interfaces 310a-b, respectively, (such as network interface cards, modems and so forth). The elements may be coupled to each other via system bus 312a-b, respectively, which may represent one or more buses. In the case of multiple buses, they may be bridged by one or more bus bridges (not shown). Each of these elements may perform its conventional functions known in the art. In some embodiments, the computers 301a-b may be stationary devices, mobile devices, or servers.

Figure 4:
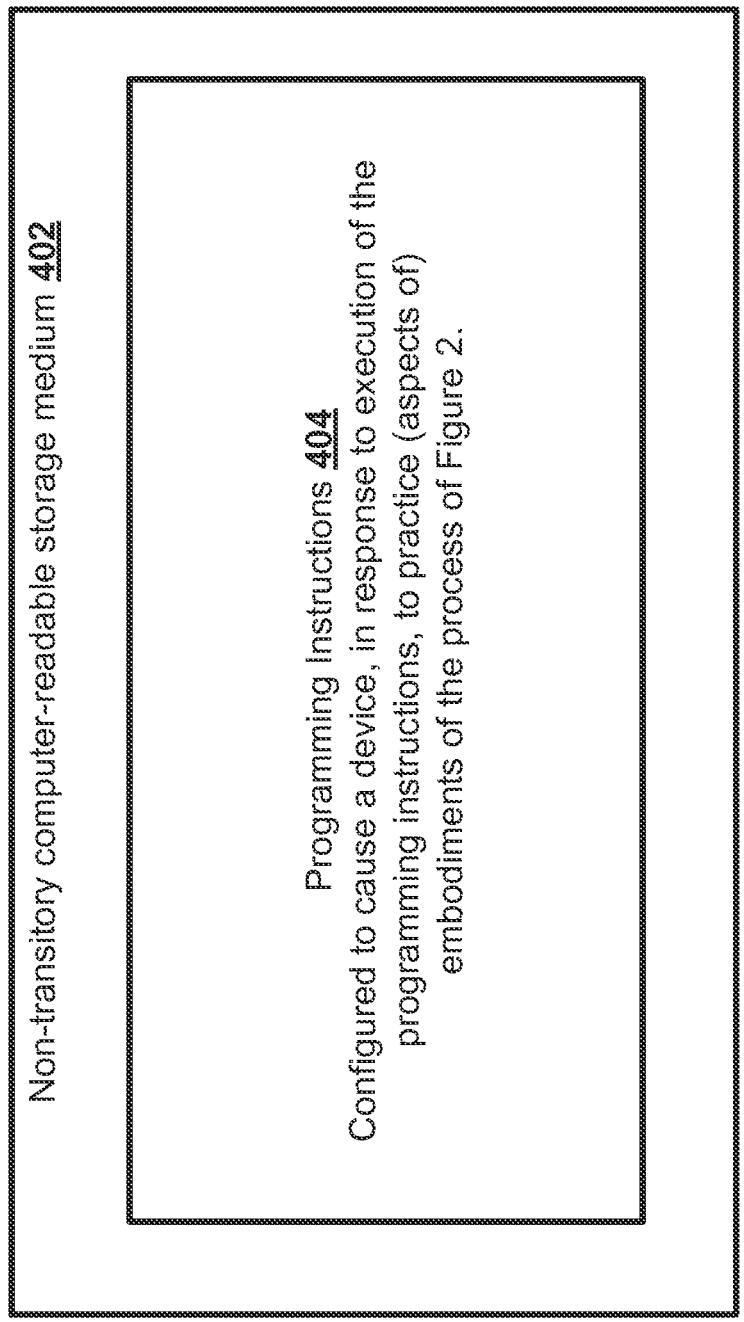
FIG. 4 illustrates a storage medium having instructions for practicing methods described herein, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 4 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 402 may include a number of programming instructions 404. Programming instructions 404 may be configured to enable a device, e.g., switch 100 or switch 330, in response to execution of the programming instructions, to perform the buffering process described herein (e.g., the buffering process described with respect to FIG. 1 or the method 200 of FIG. 2). In alternate embodiments, programming instructions 404 may be disposed on multiple computer-readable non-transitory storage media 402 instead. In alternate embodiments, programming instructions 404 may be disposed on computer-readable transitory storage media 402, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non- exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, procedures, operations, elements, and/or components, but do not preclude the presence or addition of one or more other features, integers, procedures, operation, elements, components, and/or groups thereof Embodiments may be implemented as a computer process, a computing system or as an article of manufacture such as a computer program product of computer readable media. The computer program product may be a computer storage medium readable by a computer system and encoded with computer program instructions for executing a computer process.

The corresponding structures, material, acts, and equivalents of all means plus function elements in the claims below are intended to include any structure, material or act for performing the function in combination with other claimed elements that are specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments discussed herein were chosen and described in order to illustrate the principles of the disclosure and the practical application, and to enable others of ordinary skill in the art to understand the disclosure for embodiments with various modifications as are suited to the particular use contemplated.

Some non-limiting Examples of various embodiments are presented below.

Example 1 may include a switch for routing packets comprising a plurality of queue buffers; a plurality of queues respectively associated with the plurality of queue buffers; a shared buffer; and a queue point controller coupled with the plurality of queue buffers and the shared buffer, wherein the queue point controller is to: receive a portion of a packet from a transmission point destined for a selected queue of the plurality of queues; determine an amount of available space in a selected queue buffer, of the plurality of queue buffers, associated with the selected queue; and allocate at least a portion of the shared buffer to the selected queue based on the amount of available space determined in the selected queue buffer, wherein the portion of the shared buffer is invisible to the transmission point.

Example 2 may include the subject matter of Example 1, wherein to allocate at least a portion of the shared buffer to the selected queue based on the amount of available space determined in the selected queue buffer is based on whether the amount of available space in the selected queue buffer is equal to or less than a threshold of available space.

Example 3 may include the subject matter of either of Examples 1 or 2, wherein the selected queue is coupled with one or more output ports of the network switch, wherein the portion of the packet is destined for an output port of the one or more output ports, and wherein the queue point controller is further to: store the portion of the packet in the portion of the shared buffer; and send a signal to the transmission point to enable the portion of the shared buffer to be invisible to the transmission point, wherein the signal is to: prevent the transmission point from decrementing a credit counter associated with the selected queue; or cause the transmission point to increment the credit counter associated with the selected queue.

Example 4 may include the subject matter of Example 3, wherein the size of the portion of the shared buffer is based on a size of the packet.

Example 5 may include the subject matter of either of Examples 3 or 4, wherein the credit counter is part of a credit based flow control mechanism of the switch, and wherein the signal is indicative to the transmission point of data having been moved away from the selected queue.

Example 6 may include the subject matter of any one of Examples 3-5, wherein the plurality of queue buffers, the plurality of queues, and the shared buffer form a queue point, and the predefined threshold is based on a round trip transmission time between the transmission point and the queue point.

Example 7 may include the subject matter of any one of Examples 3-6, wherein the credit counter is a transmission point credit counter to enable the transmission point to monitor an amount of available space in the selected queue buffer and the switch further comprises a local credit counter associated with the selected queue, wherein the queue point controller is further to cause the local credit counter to imitate the transmission point credit counter, to enable the queue point controller to determine when to send the signal to the transmission point.

Example 8 may include the subject matter of Example 7, wherein the queue point controller is further to: determine whether a previously allocated portion of the shared buffer is needed; and release the previously allocated portion of the shared buffer in response to a determination that the allocated portion is no longer needed.

Example 9 may include the subject matter of Example 8, wherein to determine whether the previously allocated portion of the shared buffer is no longer needed is based on an indication that the previously allocated portion of the shared buffer is empty and: an indication that the selected queue buffer is empty; an indication that another previously allocated portion of the shared buffer has an amount of available space greater than or equal to a predefined threshold; or an indication that another previously allocated portion of the shared buffer has an amount of available space equal to or greater than a value of the local counter.

Example 10 may include the subject matter of Example 9, wherein the transmission point credit counter and the local credit counter are to reset to a size of the selected queue buffer, in response to a reset of the switch.

Example 11 may include the subject matter of any one of Examples 1-10, wherein the plurality of queue buffers, the plurality of queues, and the shared buffer form a queue point, and the transmission point is another queue point of the switch.

Example 12 may include the subject matter of Example any one of Examples 1-11, wherein the plurality of queue buffers, the plurality of queues, and the shared buffer form a queue point, and the queue point is part of a sub-switch of the switch.

Example 13 may include the subject matter of any one of Examples 1-12, wherein the switch is a system on chip (SoC) further comprising one or more processors.

Example 14 may include a method of operating switch, comprising: receiving, by a queue point controller of a queue point of the switch, at least a portion of a packet from a transmission point; storing, by the queue point controller, the portion of the packet in a queue buffer associated with a queue of the queue point; determining, by the queue point controller, available space in the queue buffer; allocating, by the queue point controller, based on the available space in the queue buffer, at least a portion of a shared buffer to the queue, wherein the shared buffer is associated with a one or more additional queues of the queue point; and sending, by the queue point controller, a signal to the transmission point to prevent the transmission point from decrementing a credit counter associated with the queue or to cause the transmission point to increment the credit counter associated with the queue.

Example 15 may include the subject matter of Example 14, wherein allocating based on the amount of available space determined in the queue buffer is based on whether the amount of available space in the queue buffer is equal to or less than a predefined threshold of available space.

Example 16 may include the subject matter of Example 15, wherein the credit counter is part of a credit based flow control mechanism of the switch, and wherein the signal is indicative of data being moved away from the queue.

Example 17 may include the subject matter of either of Examples 15 or 16, wherein the predefined threshold is based on a round trip transmission time between the transmission point and the queue point.

Example 18 may include the subject matter of any one of Examples 15-17, wherein the credit counter is a transmission point credit counter to enable the transmission point to monitor an amount of available space in the queue buffer, the method further comprising: causing, by the queue point controller, a local credit counter to imitate the transmission point credit counter; and determining, by the queue point controller, when to send the signal to the transmission point based at least in part on the value of the local counter.

Example 19 may include the subject matter of Example 18, further comprising resetting the local credit counter to a size of the queue buffer, in response to a reset of the switch.

Example 20 may include one or more non-transitory computer-readable media having instructions stored thereon, wherein the instructions cause a queue point controller of a queue point of a switch, in response to execution by the queue point controller, to: receive at least a portion of a packet from a transmission point; store the portion of the packet in a queue buffer associated with a queue of the queue point; allocate, based on an amount of available space in the queue buffer, at least a portion of a shared buffer to the queue, wherein the shared buffer is associated with one or more additional queues of the queue point; and send a signal to the transmission point to prevent the transmission point from decrementing a credit counter associated with the queue or to cause the transmission point to increment the credit counter associated with the queue.

Example 21 may include the subject matter of Example 20, wherein to allocate based on the amount of available space in the queue buffer is based on whether the amount of available space in the queue buffer is equal to or less than a predefined threshold of available space.

Example 22 may include the subject matter of Example 21, wherein the credit counter is part of a credit based flow control mechanism of the switch, and wherein the signal is indicative of data having been moved away from the queue.

Example 23 may include the subject matter of either of Examples 21 or 22, wherein the predefined threshold is based on a round trip transmission time between the transmission point and the queue point.

Example 24 may include the subject matter of any one of Examples 21-23, wherein the credit counter is a transmission point credit counter to enable the transmission point to monitor an amount of available space in the queue buffer, and wherein the instructions, in response to execution by the queue point controller, further cause the queue point controller to: cause a local credit counter to imitate the transmission point credit counter; and determine when to send the signal to the transmission point based at least in part on the value of the local counter.

Example 25 may include the subject matter of Example 24, wherein the instructions, in response to execution by the queue point controller, further cause the queue point controller to reset the local credit counter to a size of the queue buffer, in response to a reset of the switch.

Example 26 may include a switch for routing packets, comprising: means for receiving, by a queue point of the switch, at least a portion of a packet from a transmission point; means for storing, by the queue point controller, the portion of the packet in a queue buffer associated with a queue of the queue point, wherein the queue is associated with an output port of the switch to which the packet is being transmitted to; means for determining available space in the queue buffer; means for allocating based on the available space in the queue buffer, at least a portion of a shared buffer to the queue, wherein the shared buffer is associated with a one or more additional queues of the queue point; and means for sending a signal to the transmission point to prevent the transmission point from decrementing a credit counter associated with the queue or to cause the transmission point to increment the credit counter associated with the queue.

Example 27 may include the subject matter of Example 26, wherein allocating based on the amount of available space determined in the queue buffer is based on whether the amount of available space in the queue buffer is equal to or less than a predefined threshold of available space.

Example 28 may include the subject matter of Example 27, wherein the credit counter is part of a credit based flow control mechanism of the switch, and wherein the signal is indicative of data being moved away from the queue.

Example 29 may include the subject matter of either of Examples 27 or 28, wherein the predefined threshold is based on a round trip transmission time between the transmission point and the queue point.

Example 30 may include the subject matter of any one of Examples 27-29, wherein the credit counter is a transmission point credit counter to enable the transmission point to monitor an amount of available space in the queue buffer, the method further comprising: means for causing a local credit counter to imitate the transmission point credit counter;

and means for determining when to send the signal to the transmission point based at least in part on the value of the local counter.

Example 31 may include the subject matter of Example 30, further comprising means for resetting the local credit counter to a size of the queue buffer, in response to a reset of the switch.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A switch for routing packets, comprising:
   a plurality of queues respectively associated with a plurality of queue buffers;
   a shared buffer; and
   a queue point controller coupled with the plurality of queue buffers and the shared buffer, wherein the queue point controller is to:
      receive a portion of a packet from a transmission point destined for a selected queue of the plurality of queues;

determine an amount of available space in a selected queue buffer, of the plurality of queue buffers, associated with the selected queue; and allocate at least a portion of the shared buffer to the selected queue based on the amount of available space determined in the selected queue buffer based on a threshold value of available space in the selected queue buffer.

2. The switch of claim 1, wherein to allocate at least a portion of the shared buffer to the selected queue based on the amount of available space determined in the selected queue buffer is based on whether the amount of available space in the selected queue buffer is equal to or less than a threshold of available space.

3. The switch of claim 1, wherein the selected queue is coupled with one or more output ports of the switch, wherein the portion of the packet is destined for an output port of the one or more output ports, and wherein the queue point controller is further to:

store the portion of the packet in the portion of the shared buffer; and send a signal to the transmission point to:
prevent the transmission point from decrementing a credit counter associated with the selected queue; or
cause the transmission point to increment the credit counter associated with the selected queue.

4. The switch of claim 3, wherein the size of the portion of the shared buffer is based on a size of the packet.

5. The switch of claim 3, wherein the credit counter is part of a credit based flow control mechanism of the switch, and wherein the signal is indicative to the transmission point of data having been moved away from the selected queue.

6. The switch of claim 3, wherein the plurality of queue buffers, the plurality of queues, and the shared buffer form a queue point, and the predefined threshold is based on a round trip transmission time between the transmission point and the queue point.

7. The switch of claim 3, wherein the credit counter is a transmission point credit counter to enable the transmission point to monitor an amount of available space in the selected queue buffer and the switch further comprises a local credit counter associated with the selected queue, wherein the queue point controller is further to cause the local credit counter to imitate the transmission point credit counter, to enable the queue point controller to determine when to send the signal to the transmission point.

8. The switch of claim 7, wherein the queue point controller is further to:

determine whether a previously allocated portion of the shared buffer is needed; and release the previously allocated portion of the shared buffer in response to a determination that the allocated portion is no longer needed.

9. The switch of claim 8, wherein to determine whether the previously allocated portion of the shared buffer is no longer needed is based on an indication that the previously allocated portion of the shared buffer is empty and:

an indication that the selected queue buffer is empty;
an indication that another previously allocated portion of the shared buffer has an amount of available space greater than or equal to a predefined threshold; or
an indication that another previously allocated portion of the shared buffer has an amount of available space equal to or greater than a value of the local credit counter.

10. The switch of claim 9, wherein the transmission point credit counter and the local credit counter are to reset to a size of the selected queue buffer, in response to a reset of the switch.

11. The switch of claim 1, wherein the plurality of queue buffers, the plurality of queues, and the shared buffer form a queue point, and the transmission point is another queue point of the switch.

12. The switch of claim 1, wherein the plurality of queue buffers, the plurality of queues, and the shared buffer form a queue point, and the queue point is part of a sub-switch of the switch.

13. The switch of claim 1, wherein the switch is a system on chip (SoC) further comprising one or more processors.

14. A method of operating switch, comprising:

receiving, by a queue point controller of a queue point of the switch, at least a portion of a packet from a transmission point;

storing, by the queue point controller, the portion of the packet in a queue buffer associated with a queue of the queue point;

determining, by the queue point controller, available space in the queue buffer;

allocating, by the queue point controller, based on a threshold value of the available space in the queue buffer, at least a portion of a shared buffer to the queue, wherein the shared buffer is associated with one or more additional queues of the queue point; and sending, by the queue point controller, a signal to the transmission point to prevent the transmission point from decrementing a credit counter associated with the queue or to cause the transmission point to increment the credit counter associated with the queue.

15. The method of claim 14, wherein allocating based on the amount of available space determined in the queue buffer is based on whether the amount of available space in the queue buffer is equal to or less than a predefined threshold of available space.

16. The method of claim 15, wherein the credit counter is part of a credit based flow control mechanism of the switch, and wherein the signal is indicative of data being moved away from the queue.

17. The method of claim 15, wherein the predefined threshold is based on a round trip transmission time between the transmission point and the queue point.

18. The method of claim 15, wherein the credit counter is a transmission point credit counter to enable the transmission point to monitor an amount of available space in the queue buffer, the method further comprising:

causing, by the queue point controller, a local credit counter to imitate the transmission point credit counter; and determining, by the queue point controller, when to send the signal to the transmission point based at least in part on a value of the local credit counter.

19. The method of claim 18, further comprising resetting the local credit counter to a size of the queue buffer, in response to a reset of the switch.

20. One or more non-transitory computer-readable media having instructions stored thereon, wherein the instructions cause a queue point controller of a queue point of a switch, in response to execution by the queue point controller, to:

receive at least a portion of a packet from a transmission point;

store the portion of the packet in a queue buffer associated with a queue of the queue point;

allocate, based on a threshold value of an amount of available space in the queue buffer, at least a portion of a shared buffer to the queue, wherein the shared buffer is associated with one or more additional queues of the queue point; and send a signal to the transmission point to prevent the transmission point from decrementing a credit counter associated with the queue or to cause the transmission point to increment the credit counter associated with the queue.

21. The computer-readable media of claim 20, wherein to allocate based on the amount of available space in the queue buffer is based on whether the amount of available space in the queue buffer is equal to or less than a predefined threshold of available space.

22. The computer-readable media of claim 21, wherein the credit counter is part of a credit based flow control mechanism of the switch, and wherein the signal is indicative of data having been moved away from the queue.

23. The computer-readable media of claim 21, wherein the predefined threshold is based on a round trip transmission time between the transmission point and the queue point.

24. The computer-readable media of claim 21, wherein the credit counter is a transmission point credit counter to enable the transmission point to monitor an amount of available space in the queue buffer, and wherein the instructions, in response to execution by the queue point controller, further cause the queue point controller to:

cause a local credit counter to imitate the transmission point credit counter; and determine when to send the signal to the transmission point based at least in part on a value of the local credit counter.

25. The computer-readable media of claim 24, wherein the instructions, in response to execution by the queue point controller, further cause the queue point controller to reset the local credit counter to a size of the queue buffer, in response to a reset of the switch.

* * * * *